(12) United States Patent  (10) Patent No.: US 7,637,092 B2
Utaki et al.  (45) Date of Patent: Dec. 29, 2009

(54) CABLE PROTECTION AND GUIDE DEVICE

(75) Inventors: Akihiko Utaki, Osaka (JP); Masaaki Ikeda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 12/359,275

(22) Filed: Jan. 23, 2009

(65) Prior Publication Data

US 2009/0266045 A1  Oct. 29, 2009

(30) Foreign Application Priority Data

Apr. 25, 2008  (JP) .............................. 2008-115456

(51) Int. Cl.
   *F16G 13/16*  (2006.01)
(52) U.S. Cl. .............................. 59/78.1; 59/900; 248/49
(58) Field of Classification Search .................. 59/78.1; 248/49, 51
   See application file for complete search history.

(56) References Cited

U.S. PATENT DOCUMENTS

| | | | |
|---|---|---|---|
| 6,978,595 B2 * | 12/2005 | Mendenhall et al. ......... | 59/78.1 |
| 7,305,815 B2 * | 12/2007 | Utaki et al. .................. | 59/78.1 |
| 7,317,160 B2 * | 1/2008 | Utaki ........................ | 59/78.1 |
| 7,392,650 B2 * | 7/2008 | Utaki et al. .................. | 59/78.1 |
| 7,406,819 B2 * | 8/2008 | Utaki et al. .................. | 59/78.1 |
| 7,428,808 B2 * | 9/2008 | Utaki et al. .................. | 59/78.1 |
| 7,513,096 B2 * | 4/2009 | Utaki et al. .................. | 59/78.1 |
| 7,513,097 B2 * | 4/2009 | Utaki et al. .................. | 59/78.1 |
| 7,526,910 B2 * | 5/2009 | Komiya ...................... | 59/78.1 |

FOREIGN PATENT DOCUMENTS

JP  2006-250258  9/2006

* cited by examiner

*Primary Examiner*—David B Jones
(74) *Attorney, Agent, or Firm*—Woodling, Krost and Rust

(57) ABSTRACT

A cable protection and guide device in which the number of parts used is reduced and assembly is simplified. Dust generation and bending fatigue is suppressed so that the cable protection and guide device exhibits excellent form stability of the cable accommodating space. Side plate portions and coupling portions are integrally molded from polyamide fatigue resistant resin into the form of a connecting link module. A polyacetal resin stopper link, which holds and limits the linear position and the bending position by engagement with the connecting link module, is inter-fitted with a coupling portion of the connecting link module by a snap-fit mechanism from the cable accommodating space side.

10 Claims, 12 Drawing Sheets

CABLE PROTECTION AND GUIDE DEVICE

This patent application claims priority to Japanese Patent Application 2008-115456 filed on Apr. 25, 2008.

TECHNICAL FIELD

The present invention relates to a cable protection and guide device. More specifically it relates to a cable protection and guide device which preferably accommodates a cable or a hose or multiple cables and hoses. The cable supplies the movable portion of an industrial machine with energy such as electric power or compressed air. The protection and guide device stably and reliably supports and guides the cable during movement of the movable portion.

BACKGROUND TECHNOLOGY

A conventional cable protection and guide device is shown in FIG. 11. A cable protection and guide device 500 is formed such that a number of pairs of spaced right and left side plate portions 510A and 510B are connected to each other from a mounting fixed end to a mounting movable end in a longitudinal direction. Connecting arms 520 are respectively bridged over a bending inner circumferential side and a bending outer circumferential side of these side plate portions 510A and 510B at every interval of connected side plate portions 510A and 510B. A cable C is accommodated into a cable accommodating space which has a rectangular section formed by the pairs of right and left side plate portions 510A and 510B and connecting arms 520, 520 arranged on the bending inner circumferential side and on the bending outer circumferential side in a bridged state along the longitudinal direction of the device.

In the conventional cable protection and guide device 500, side plate portions 510A and 510B are respectively integrally formed of a front side plate portion 511, a rear side plate portion 512 and a flexible coupling 513 connected interposed between the front side plate portion 511 and the rear side plate portion 512. The side plate portions 510A and 510B are interconnected to preceding side plate portions 510A and 510B. Rear side plate portions 512 are connected to subsequent front side plate portions 511. Front side plate portions 511 are connected to preceding rear side plate portions 512. A snap-fit mechanism mutually engages adjacent side plate portions 510A, 510B to each other. The snap-fit mechanism is located between a rear side plate portion 512 of one side plate portion 510A, 510B and a front side plate portion 511 of an adjacent side plate portion 510A, 510B. Adjacent side plate portions 510A, 510B are detachably affixed to each other by the snap-fit mechanism enabling easy maintenance. See for example Patent Reference 1, Japanese Laid-Open Patent Publication No. 2006-250258, and in particular page 1 and FIG. 3 thereof.

Problems to be Solved by the Invention

The above-mentioned conventional cable protection and guide device 500 includes a pair of right and left side plate portions 510A and 510B having three portions, namely: the front side plate portion 511; the rear side plate portion 512; and the coupling 513. The side plate portions 510A and 510B have a complicated shape. A mold is necessary to form the components of the guide device.

The side plate portions 510A and 510B are respectively independent parts and considerable time is necessary to connect them.

Further, since the pair of spaced right and left side plate portions 510A and 510B are mirror images of each other they are not interchangeable necessitating separate management of the respective right and left side plate portions 510A and 510B.

Polyamide resin connecting arms 520 are bridged over the bending inner circumferential side and the bending outer circumferential side of a pair of spaced right and left polyamide resin side plate portions 510A and 510B to form a cable accommodating space of a rectangular section. The connecting arms 520 must be securely bonded to the side plate portions 510A and 510B so as to absorb the deflectional and torsional stresses applied to the side plate portions 510A, 510B. However, the connecting arms 520 are not bonded to the side plate portions 510A, 510B well enough during assembly so that a stable rectangular cross-sectional form of the cable accommodating space is achieved. Certain cables, for example, those used in the production of foods and semiconductors require a clean environment and the generation of dust such as a wear powder due to sliding contact with the cable C and mutual sliding contact between side plate portions 510A and 510B cannot be tolerated. Excessive bending fatigue in the coupling 513 is also known to be a problem.

SUMMARY OF THE INVENTION

Accordingly, the present invention provides a cable protection and guide device in which is easy to manufacture and assemble. Dust generation and bending fatigue during accommodation and guiding of cables are suppressed. The cable protection and guide device exhibits excellent dimensional stability of the cable accommodating space.

Means for Solving the Problems

The invention solves the above-described problems. A cable protection and guide device in which a number of pairs of spaced right and left side plate portions are connected to each other from a mounting fixed end to a mounting movable end is provided, in which: connecting arms are respectively bridged over a bending inner circumferential side and a bending outer circumferential side of the side plate portions at predetermined intervals; a cable is accommodated and guided in a cable accommodating space surrounded by the side plate portions and the connecting arms from the mounting fixed end toward the mounting movable end so that the cable protection and guide device assumes a linear position and a bending position; the side plate portions and the coupling portions are integrally molded and form a polyamide fatigue resistant resin connecting link module; and, a polyacetal resin stopper link, which holds and limits the linear position and the bending position by engagement with the connecting link module, is incorporated in the coupling portion of the connecting link module by a snap-fit mechanism from the cable accommodating space side.

The invention further solves the above-described problems by employing a polyamide fatigue resistant resin which contains a rubber component.

The invention further solves the above-described problems by forming the connecting arm of a polyacetal resin.

The invention further solves the above-described problems by molding the connecting arm integrally with one of a bending inner circumferential side and a bending outer circumferential side of the stopper link.

The invention further solves the above-described problems by molding the connecting arm with the bending inner circumferential side and/or bending outer circumferential side of the stopper link in a cantilever state such that the cable accommodating space can be opened and closed.

EFFECTS OF THE INVENTION

According to the cable or like protection and guide device of the present invention: a number of pairs of spaced right and left side plate portions are connected to each other from a mounting fixed end to a mounting movable end; connecting arms axe respectively bridged over a bending inner circumferential side and a bending outer circumferential side of the side plate portions at predetermined intervals; and, the cable is accommodated and guided in a cable accommodating space surrounded by the side plate portions and the connecting arms from a mounting fixed end toward a mounting movable end so that the cable protection and guide device can assume a linear position and/or a bending position. Additionally the following significant effects are obtained by the configurations of the present invention.

The cable protection and guide device of the present invention includes: integrally molded side plate portions and coupling portions which form a connecting link module; a stopper link, which holds and limits the linear position and the bending position by engagement with the connecting link module, and, the stopper link is inter-fitted with the coupling portion of the connecting link module by a snap-fit mechanism from the cable accommodating space side. Thus, the number of parts and attendant assembly thereof is reduced.

The connecting link module is incorporated to a stopper link by the snap-fit mechanism and the tensile stress applied to the coupling arm is dispersed through the snap-fit mechanism. Thus large tensile stresses in the coupling arm are reduced so that bending fatigue is suppressed and endurance is improved.

The connecting link module is formed of a polyamide fatigue resistant resin and the stopper link is formed of a polyacetal resin. The polyacetal resin of the stopper link exhibits high rigidity whereby a snap-fit mechanism, which exhibits large bonding strength during assembly of the device, can be formed. Further, since the polyamide fatigue resistant resin connecting link module and the polyacetal resin stopper link smoothly slide with respect to each other, the generation of dust such as wear powder is suppressed enabling to use of the device in a clean environment such as with foods and semiconductors.

The polyamide fatigue resistant resin contains a rubber component which significantly improves bending fatigue resistance of the connecting link module. Therefore, even if the connecting link module is repeatedly bent for a long period of time excellent endurance is exhibited.

The connecting arm is formed of a polyacetal resin. The stopper link and the connecting arm exhibit deflection rigidity and torsional rigidity during assembly. Therefore, a rectangular cross-sectional form of the cable accommodating space surrounded by connecting arms bridged over a pair of spaced right and left stopper links is ensured.

The connecting arm is integrally molded with a bending inner circumferential side and a bending outer circumferential side of the stopper link. The number of parts is thus reduced. Therefore, parts management is simplified and at the same time assembly is simplified.

The connecting arm is integrally molded with the bending inner circumferential side and/or bending outer circumferential side of the stopper link in a cantilever state such that the cable accommodating space can be opened and closed. Opening and closing of the cable accommodating space at a necessary position is possible so that use of the cable in the cable accommodating space is simplified and maintenance work can be also simplified.

A cable protection and guide device is disclosed, in which: a number of pairs of spaced right and left side plate portions are connected to each other from a mounting fixed end to a mounting movable end; connecting arms are respectively bridged over a bending inner circumferential side and a bending outer circumferential side of the side plate portions at predetermined intervals; a cable is accommodated and guided in a cable accommodating space surrounded by the side plate portions and the connecting arms from the mounting fixed end toward the mounting movable end so that cable protection and guide device assumes a linear position and a bending position; the side plate portions and coupling portions are integrally molded of a polyamide fatigue resistant resin and form a connecting link module; and, a polyacetal resin stopper link, which holds and limits the linear position and the bending position by engagement with said connecting link module, is inter-fitted with the coupling portion of the connecting link module by a snap-fit mechanism from the cable accommodating space side. The invention includes fewer parts than the related art. Because there are fewer parts the assembly is easier. Dust generation and bending fatigue is suppressed. Other embodiments of the present invention may be adopted.

Materials of the connecting link module forming the cable protection and guide device of the present invention may include a polyamide fatigue resistant resin which exhibits fatigue resistance. In particular, a rubber component containing polyamide 6 resin, a rubber component containing polyamide 66 resin, a rubber component containing polyamide 12 resin, and/or any elastic polymer resin called an elastomer are used, which increase flexibility and durability. Thus since impact resistance and fatigue resistance excellent to repeated bending are exhibited and at the same time high slidability is exhibited, wear powder is not generated and these resins are preferred.

The materials of the stopper link may be any polyacetal resins which exhibit high deflectional rigidity and torsional rigidity.

The side plate portion and stopper link forming the cable protection and guide device of the present invention preferably have a right and left symmetrical shape with respect to the central vertical line. In this case parts management is simplified because the parts are interchangeable as the pair of right and left side plate portions and stopper links have the same shape.

The connecting arms forming the cable protection and guide device of the present invention bridge over a bending inner circumferential side and a bending outer circumferential side of the side plate portions to surround the cable accommodating space. When the connecting arms are integrally molded on the bending inner circumferential side and the bending outer circumferential side of the stopper links, a reduction in the number of parts and a simplification of the parts management is achieved. When the connecting arms are molded integrally with any one of the bending inner circumferential side and the bending outer circumferential side of the stopper links (in a cantilever state so that the cable accommodating space can be opened and closed) the cable accommodating space can be freely opened and closed where necessary so that simplification of the cable maintenance work is achieved.

DESCRIPTION OF THE INVENTION

Example 1

A cable protection and guide device 100, which is Example 1 of the present invention, will be described by use of FIGS. 1 to 6 hereinbelow.

Figure 1:
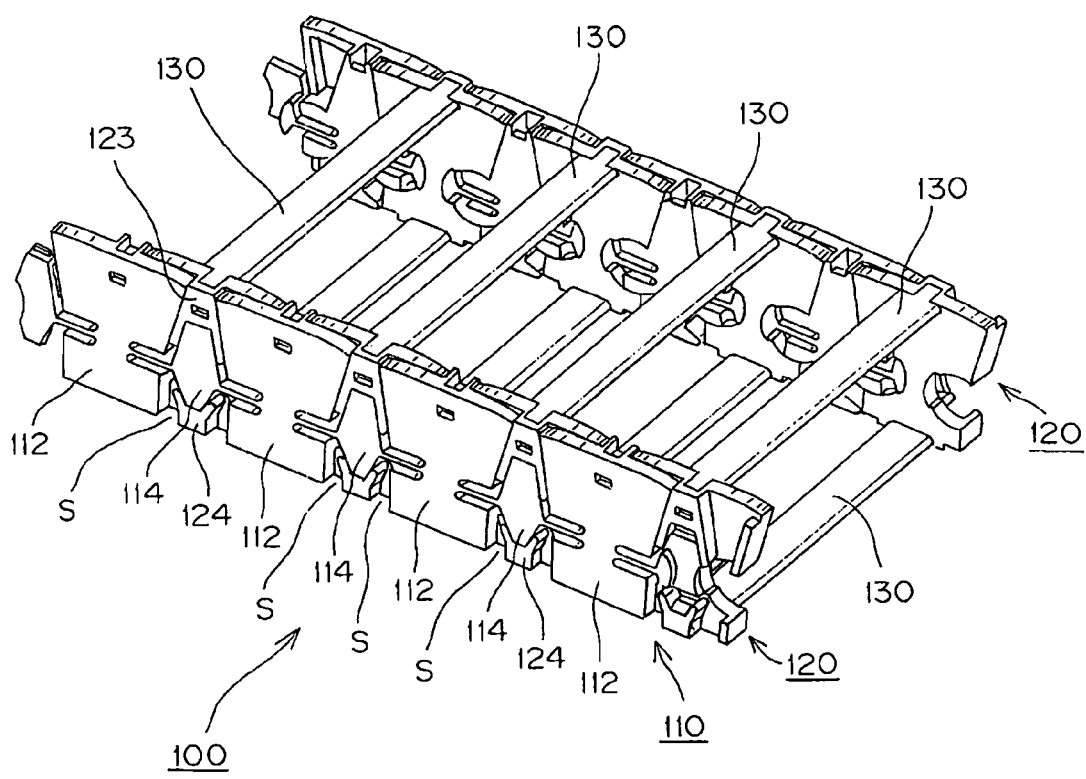
FIG. 1 is a perspective view showing a part of a cable protection and guide device 100, which is Example 1 of the present invention.
Figure 2:
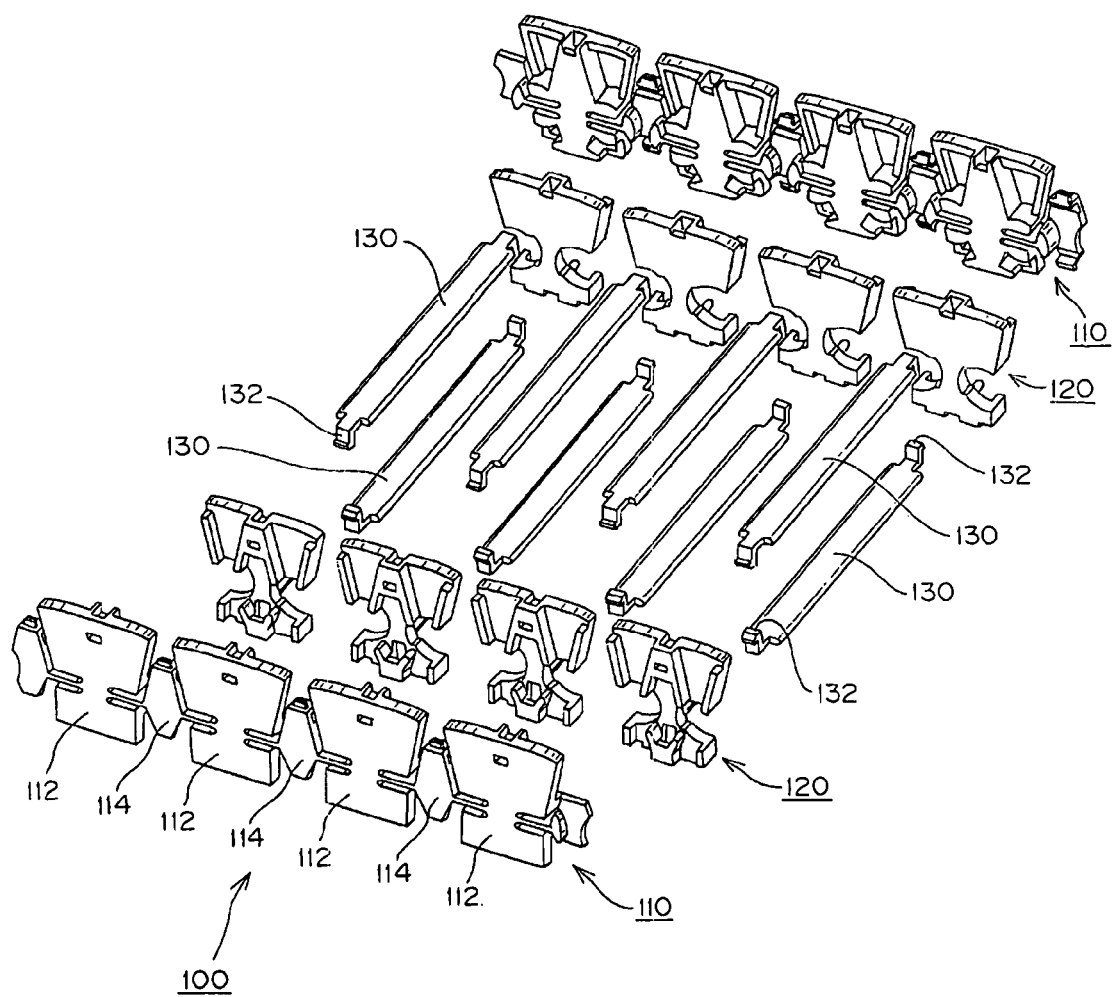
FIG. 2 is an exploded view of the cable protection and guide device 100 shown in FIG. 1.
Figure 3A:
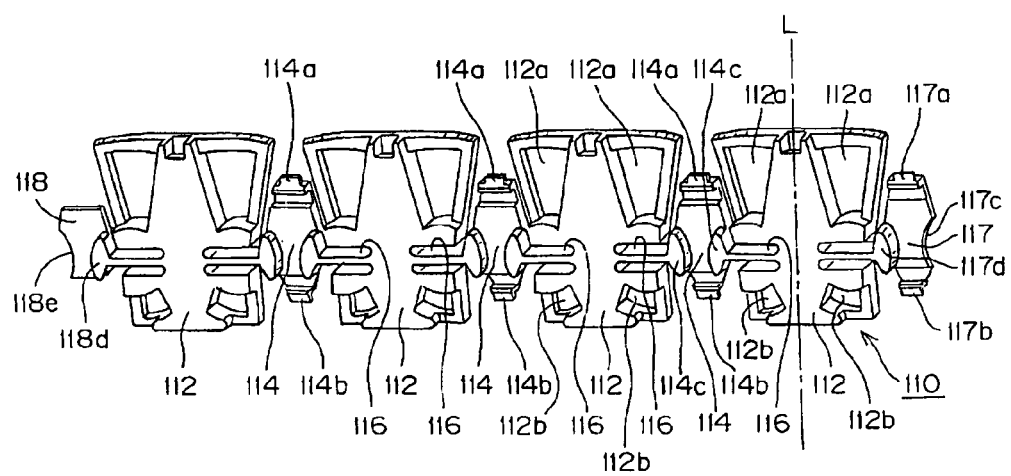
FIG. 3 is a perspective view of a connecting link module shown in FIG. 1.
Figure 3B:
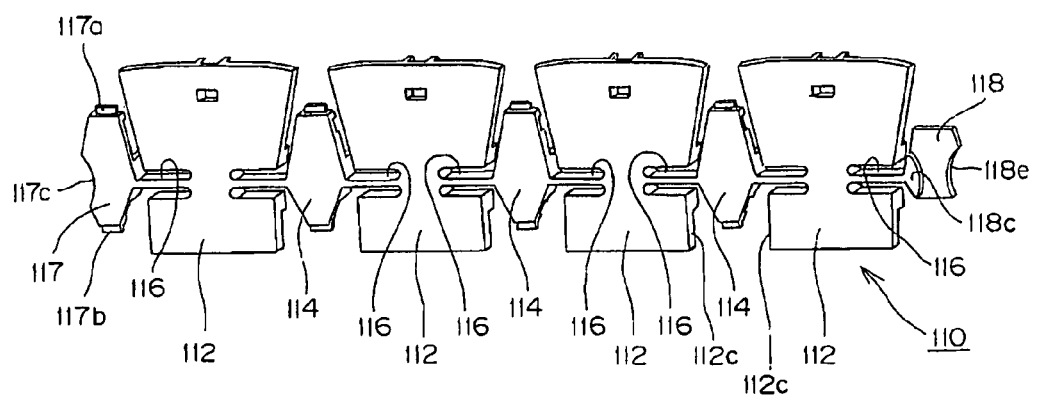
Figure 4:
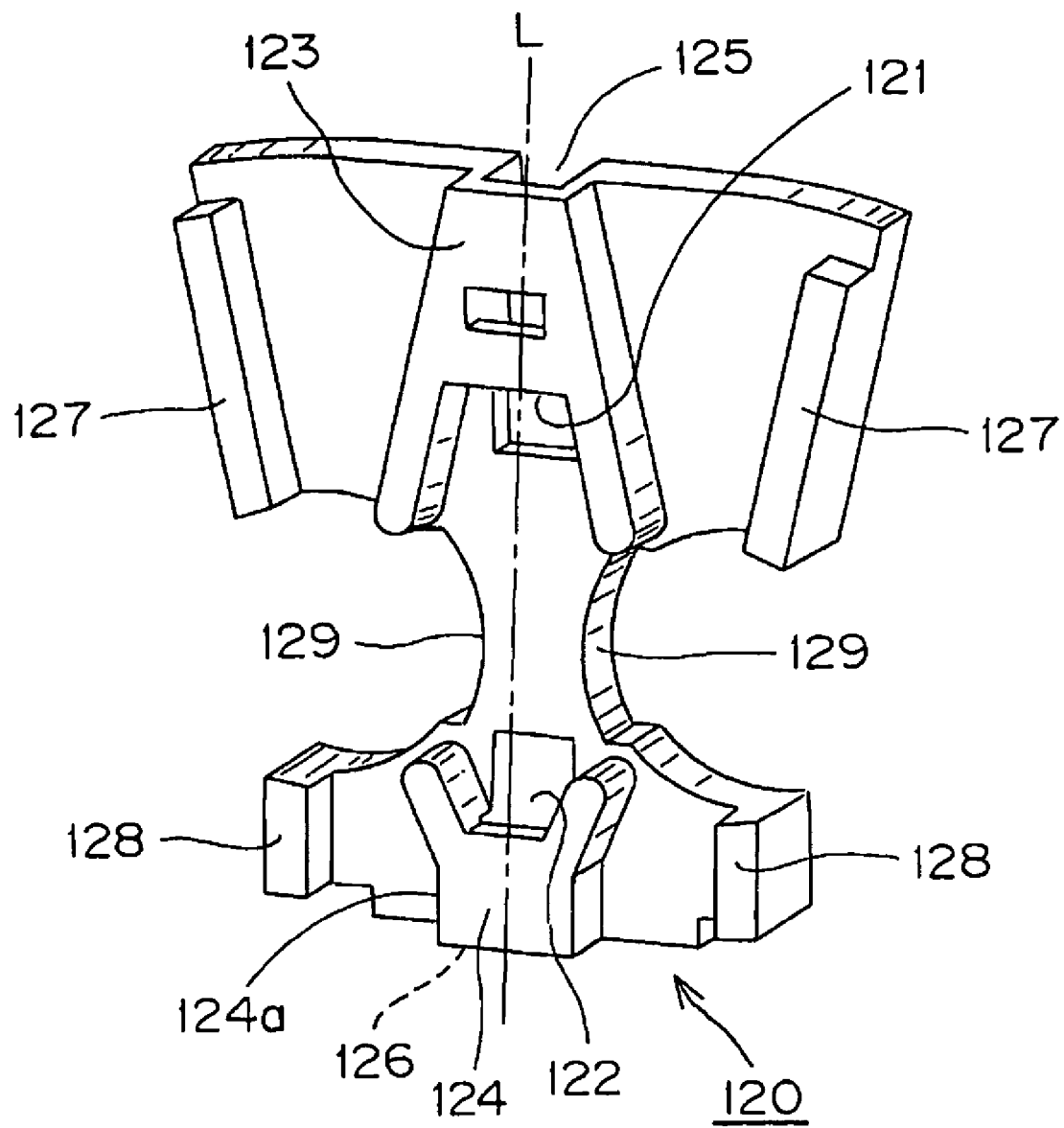
FIG. 4 is an enlarged perspective view of a stopper link shown in FIG. 1.
Figure 4:
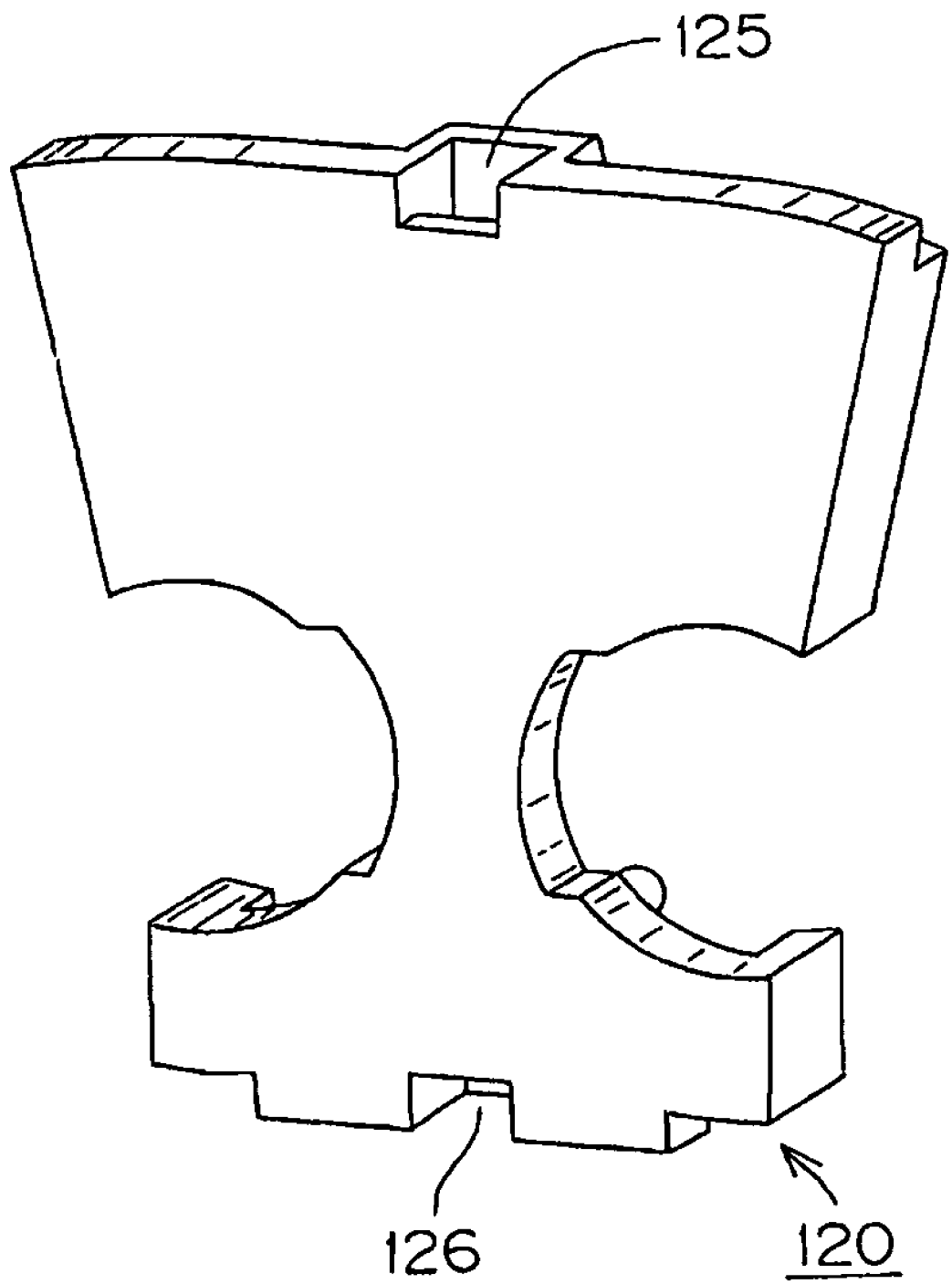

FIG. 1 is a perspective view of a part of the cable protection and guide device 100, which is the present example. FIG. 2 is an exploded view of the cable protection and guide device 100 shown in FIG. 1. FIG. 3 is a perspective view of connecting link modules 110, which are components of the cable protection and guide device 100 shown in FIG. 1, and particularly FIG. 3(a) is a perspective view from the within of a cable accommodating space and FIG. 3(b) is a perspective view from the outside of it. FIG. 4 is a perspective view of a stopper link, which is a component of the cable protection and guide device 100 shown in FIG. 1, and particularly, FIG. 4(a) is a perspective view showing a side which is incorporated to the connecting link module, and FIG. 4(b) is a perspective view from the within of the cable accommodating space side.

The cable protection and guide device 100, which is Example 1, is used for protecting and guiding a cable such as an electric cable, which connects a movable portion and a stationary portion in a semiconductor device, a pharmaceutical development sample storage device, a vehicle door opening/closing device. The cable transmits electric signals and supplies power. If a hose is used it supplies pressure liquid or pressure air. The cable protection and guide device 100 is formed by connecting a number of pairs of side plate portions in an elongated manner for connecting the above-described movable portion and stationary portion, and assumes a linear position or a bending position in accordance with relative remote movement conditions between the movable portion and the stationary portion.

The cable protection and guide device 100, which is Example 1, as shown in FIGS. 1 to 4, a plurality of side plate portions 112 and coupling portions 114 form a rubber component-containing polyamide fatigue resistance resin connecting link module 110.

The number of connected side plate portions 112 is not limited particularly. However, since 2 or 3 side plate portions 112 do not efficiently reduce the number of parts as the entire device, a connection of four or more side plate portions is preferable.

The plurality of side plate portions 112 form an elongated connecting link module 110. Horizontally elongated coupling arms 116 are connected to substantially diamond-shaped coupling portions 114 formed between adjacent side plate portions 112 and 112, as shown in FIGS. 3(a) and 3(b).

Connection of the rubber component-containing polyamide fatigue-resistant connecting link modules 110 with each other is accomplished by a connecting hook 117 formed at one end of the connecting link module 110 and a connecting plate 118 formed at the other end.

Polyacetal resin stopper link 120 as shown in FIGS. 4(a) and 4(b) is inter-fitted with coupling portion 114 of the rubber component-containing polyamide fatigue resistant connecting link module 110 by a snap-fit mechanism from within the cable accommodating space side. Stopper link 120 limits bending inner circumferential side and bending outer circumferential side bending angles of the cable protection and guide device 100 through engagement with the connecting link module 110.

Cable protection and guide device 100 forms a snap-fit mechanism: by engagement between a convex portion 114a provided on an upper portion of the coupling portion 114 shown in FIG. 3(a) and a concave portion 121 provided in the stopper link 120 shown in FIG. 4(a); and, by engagement between a convex portion 114b provided at a lower portion of the coupling portion 114 shown in FIG. 3(a) and a concave portion 122 provided in the stopper link 120 shown in FIG. 4(a).

Upper side convex portions 127 of the stopper link 120 shown in FIG. 4(a) are accommodated/fitted in upper engagement regions 112a formed on the upper right and left portions on the back surface of the side plate portion 112 shown in FIG. 3(a). Lower side convex portions 128 of the stopper link 120 shown in FIG. 4(a) are accommodated in lower engagement regions 112b formed on the lower right and left portions of the back surface of the side plate portion 112 shown in FIG. 3(a).

Further, an arc-shaped convex portion 114c formed on the back surface of the coupling portion 114 shown in FIG. 3(a) abuts an arc portion 129 of the stopper link 120 shown in FIG. 4(a).

Further, polyacetal resin stopper link 120 includes an integrally molded upper supporting portion 123 and an integrally molded lower supporting portion 124, which respectively support the coupling portion 114 shown in FIGS. 3(a) and 3(b) from the upper and lower sides.

As shown in FIG. 1, the coupling portion upper supporting portion 123 of the stopper link 120 fits between adjacent side plate portions 112, 112 and an upper portion of the coupling portion 114.

This configuration limits the bending of the cable protection and guide device 100 of Example 1 beyond a substantially straight line on a bending outer circumferential side.

Coupling portion lower supporting portion 124 of the stopper link 120 abuts a lower portion of the coupling portion 114 formed between adjacent side plate portions 112, 112. Spaces S are formed (as shown in FIG. 1) between side surfaces 124a of the coupling portion lower supporting portion 124 shown in FIG. 4(a) and lower side surfaces 112c of adjacent side plate portions 112, 112 shown in FIG. 3(b).

Abutment between side surface 124a of the coupling portion lower supporting portion 124 and the lower side surface 112c of the side plate portion 112 limits the bending inner circumferential side bending angle of the cable protection and guide device 100.

Next, a connecting mechanism between adjacent connecting link modules 110 will be described.

As shown in FIGS. 3(a) and 3(b), a connecting hook 117 having an outer appearance similar to the shape of the coupling portion 114, is formed at one end of the rubber component containing polyamide fatigue resistant resin connecting link module 110.

Connecting hook 117 has an arc-shaped cutout portion 117c at the outermost side edge portion. An arc-shaped convex portion 117d is formed at the end of coupling arm 116.

A connecting plate 118 is formed at the other end of the rubber component containing polyamide fatigue resistant resin connecting link module 110.

An arc-shaped convex portion 118c is formed at the end of coupling arm 116 at an outer surface of connecting plate 118.

An arc-shaped convex portion 118d is formed on the inside surface of the connecting plate 118. By inside surface it is meant from the perspective of the cable accommodating space. See FIGS. 3(a) and 3(b).

Figure 5:
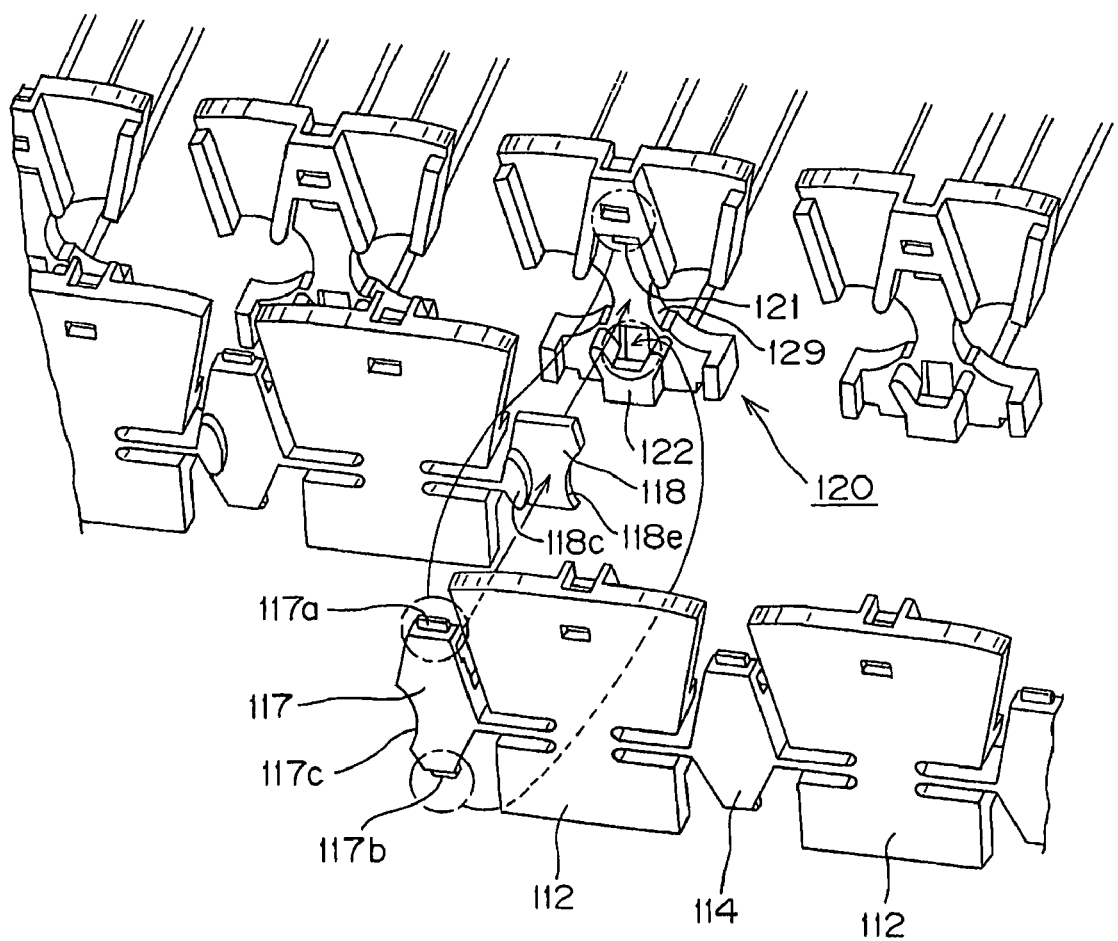
FIG. 5 is a perspective view explaining a connection mechanism of a connecting link module.

Referring to FIG. 5, when the connecting hook 117 and the connecting plate 118 are mated with each other, the following occurs: a convex portion 117a provided at an upper portion of the connecting hook 117 engages with a concave portion 121 provided on the stopper link 120; a convex portion 117b provided at a lower portion of the connecting hook 117 engages with a concave portion 122 provided on the stopper link 120; and, the arc-shaped cutout portion 117c of the connecting hook 117 is fitted to the arc-shaped convex portion 118c of the connecting plate 118. A snap-fit mechanism is formed so that two connecting link modules 110 are connected to each other.

An arc-shaped convex portion 117d is formed on a back surface of the connecting hook 117 and engages an arc-shaped cutout portion 118e formed on the outermost side edge of the connecting plate 118 and an arc portion 129 of the stopper link 120.

Figure 6:
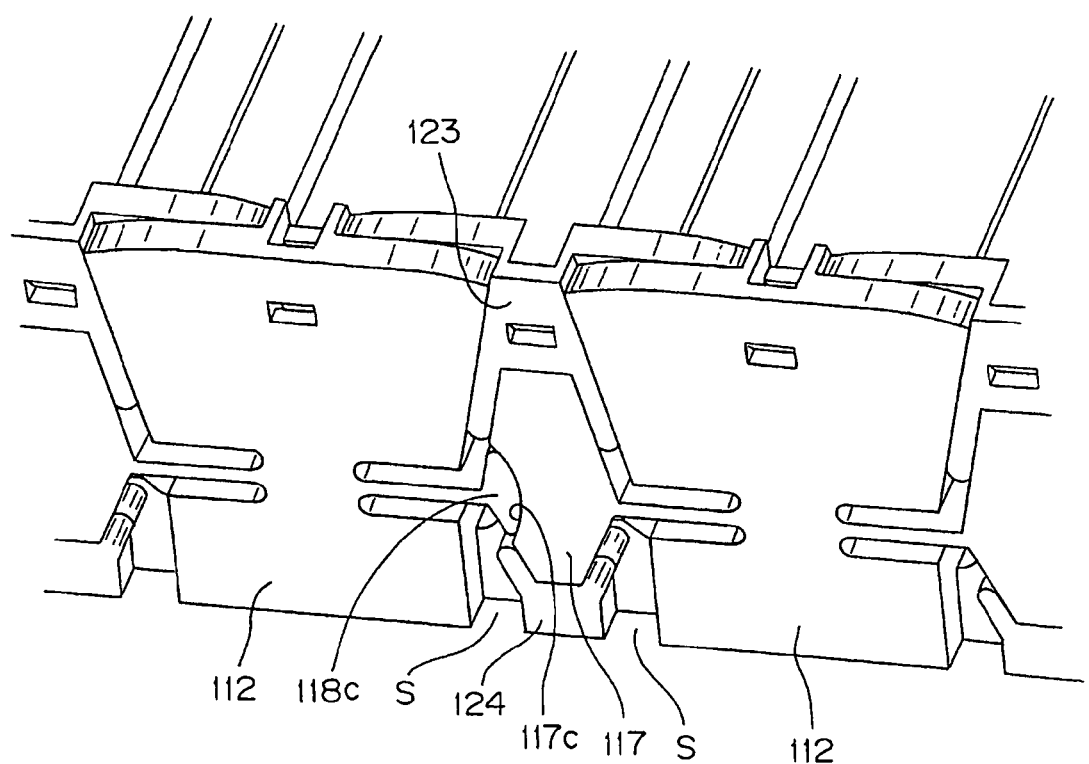
FIG. 6 is an enlarged view of a connected portion when connecting link modules are connected.

FIG. 6 is an enlarged view of a connected portion where two connecting modules are connected to each other.

Engagement hooks 132 are formed on both ends of the polyacetal resin connecting arm 130 as shown in FIG. 2. On the upper and lower portions of the polyacetal resin stopper link 120, engagement concave portions 125 and 126 are respectively formed, as shown in FIGS. 4(a) and 4(b). Connecting arms 130 are detachably and attachably connected to the upper and lower portions of the stopper link 120 by fitting engagement hooks 132 to the engagement concave portions 125 and 126.

Since the rubber component containing polyamide fatigue resistant resin side plate portion 112 and the polyacetal resin stopper link 120 each have right and left side shapes which are symmetrical with respect to the central vertical line L as, shown in FIGS. 3(a) and 4(a), a pair of spaced right and left side plate portions 112 and the stopper link 120 can respectively use common members without having to worry about using specific right and left portions.

The cable protection and guide device 100 of Example 1 of the present invention, the side plate portions 112 and the coupling portions 114 are integrally molded to form connecting link module 110. The stopper link 120, which holds and limits the linear position and the bending position by engagement with the connecting link module 110, is inter-fitted with the coupling portion 114 of the connecting link module 110 by a snap-fit mechanism from the cable accommodating space side.

The connecting link module 110 is inter-fitted to the stopper link 120 by a snap-fit mechanism, and, as such the tensile stress applied to the coupling arm 116 is dispersed through the snap-fit mechanism. Thus large tensile stresses in the coupling arm 116 are prevented and bending fatigue is suppressed.

The connecting link module 110 is formed of a polyamide fatigue resistant resin and the stopper link 120 is formed of a polyacetal resin. The polyacetal resin of the stopper link 120 exhibits high rigidity whereby the snap-fit mechanism is strongly bound to the link module. The polyamide fatigue resistant resin connecting link module 110 and the polyacetal resin stopper link 120 smoothly slide with respect to each other and the generation of dust is suppressed.

The polyamide fatigue resistant resin of the connecting link module 110 contains a rubber component and the rubber component significantly improves bending fatigue resistance of the connecting link module 110. Therefore, even if the connecting module 110 is subjected to repeated bending movements for a long period of time excellent endurance is exhibited.

The connecting arm 130 is formed of a polyacetal resin. The stopper link 120 and the connecting arm 130 exhibit deflectional rigidity and torsional rigidity during assembly. Therefore, a rectangular cross-sectional form of the cable accommodating space surrounded by connecting arms 130 bridged over a pair of spaced right and left stopper links 120 is stably ensured.

Example 2

A cable protection and guide device 200 of Example 2, which is another embodiment of the present invention, will be described by use of FIGS. 7 and 8.

Figure 7:
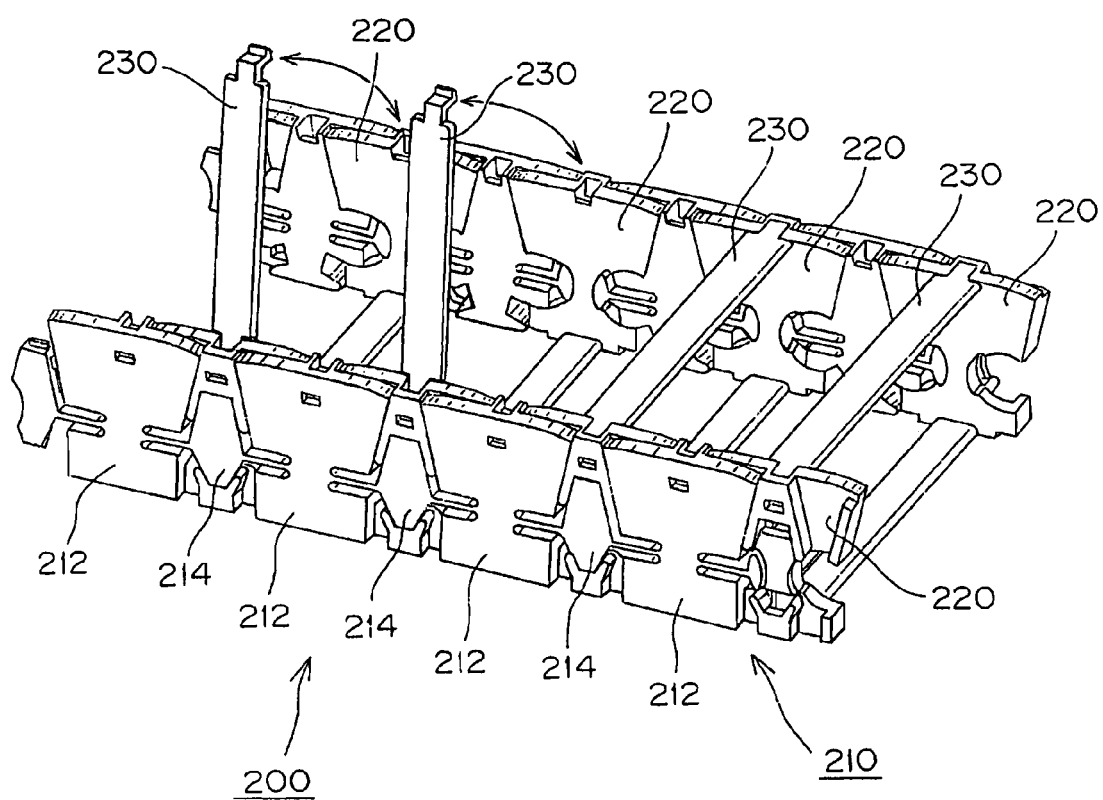
FIG. 7 is a perspective view showing a part of a cable protection and guide device 200, which is Example 2.

FIG. 7 is a perspective view of Example 2 showing a part of the cable protection and guide device 200. FIG. 8 is an exploded view of the cable protection and guide device 200 shown in FIG. 7.

Figure 8:
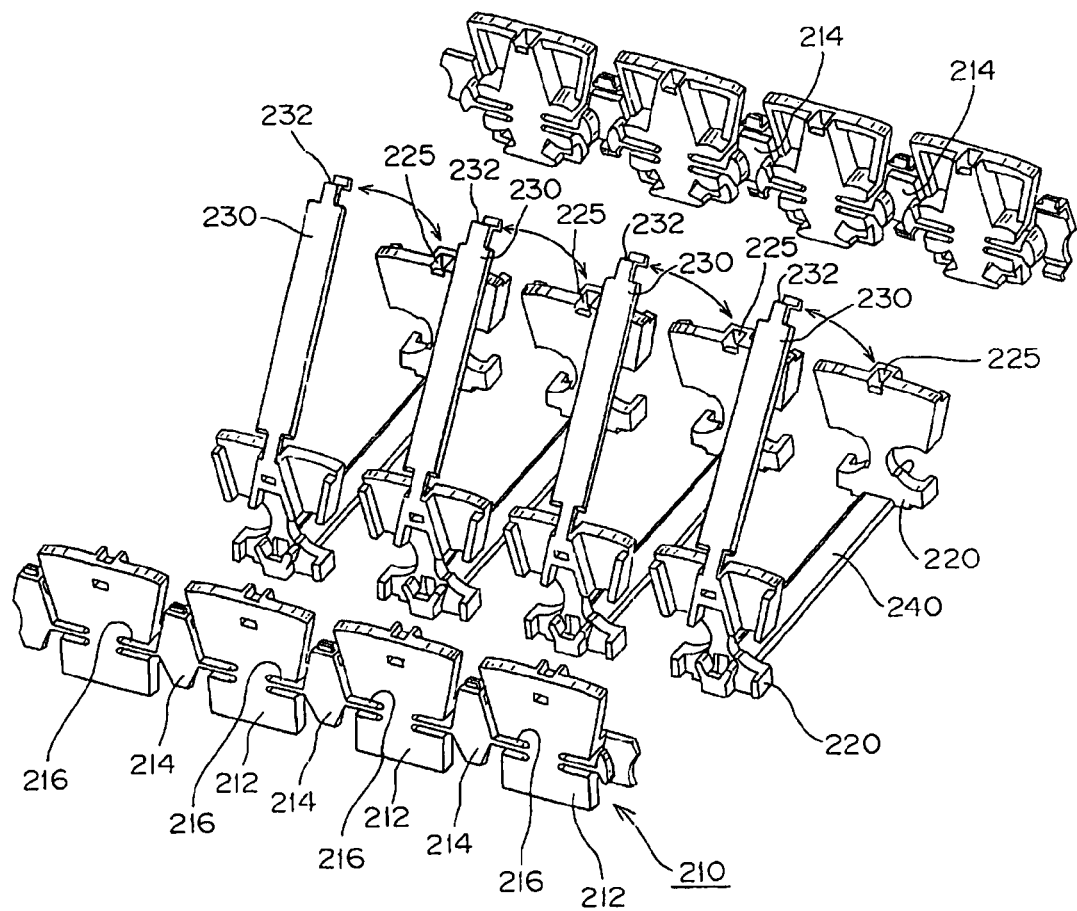
FIG. 8 is an exploded view of the cable protection and guide device 200 shown in FIG. 7.

In the cable protection and guide device 200, which is Example 2, as shown in FIGS. 7 and 8, a plurality of side plate portions 212 and coupling portions 214 are integrally molded and form a rubber component-containing polyamide fatigue resistance resin connecting link module 210.

The plurality of side plate portions 212 form an elongated connecting link module 210. Horizontally elongated coupling arms 216 are connected to substantially diamond-shaped coupling portions 214 formed between adjacent side plate portions 212, 212 as shown in FIG. 8.

And a polyacetal resin stopper link 220 is inter-fitted with a coupling portion 214 of the rubber component-containing polyamide fatigue resistant connecting link module 210 by a snap-fit mechanism. The snap-fit mechanism limits a bending inner circumferential side bending angle of the cable protection and guide device 200 as shown in FIG. 8.

Further, as shown in FIG. 8, polyacetal resin connecting arms 230 are integrally molded with the bending inner circumferential side or the bending outer circumferential side of polyacetal resin stopper links 220. The connecting arms are cantilevered from the stopper links where the cable accommodating space can be opened and closed.

An engagement hook 232 is formed on one end of the polyacetal resin upper connecting arm 230. A engagement concave portion 225 is formed at an upper portion of the polyacetal resin stopper link 220. Engagement arms 232 are detachably and attachably connected to the stopper links 220 by inter-fitting engagement hooks 232 to the engagement concave portions 225.

The polyacetal resin lower connecting arm 240 is integrally molded with a pair of right and left polyacetal resin stopper links 220.

Opening and closing of the cable accommodating space at a position necessary facilitates maintenance operation.

It is noted that since the configurations and the functions of the individual members in Example 2 are the same as those of Example 1 except that the lower connecting arm 240 is integrally molded with a pair of right and left stopper link 220 by use of a polyacetal resin, the overlapped (coextensive) explanations of Example 2 are omitted by changing reference numerals of 100s defined in Example 1 to reference numerals of 200s.

Example 3

A cable protection and guide device 300 of Example 3, which is still another embodiment of the present invention, will be described by use of FIGS. 9 and 10.

Figure 9:
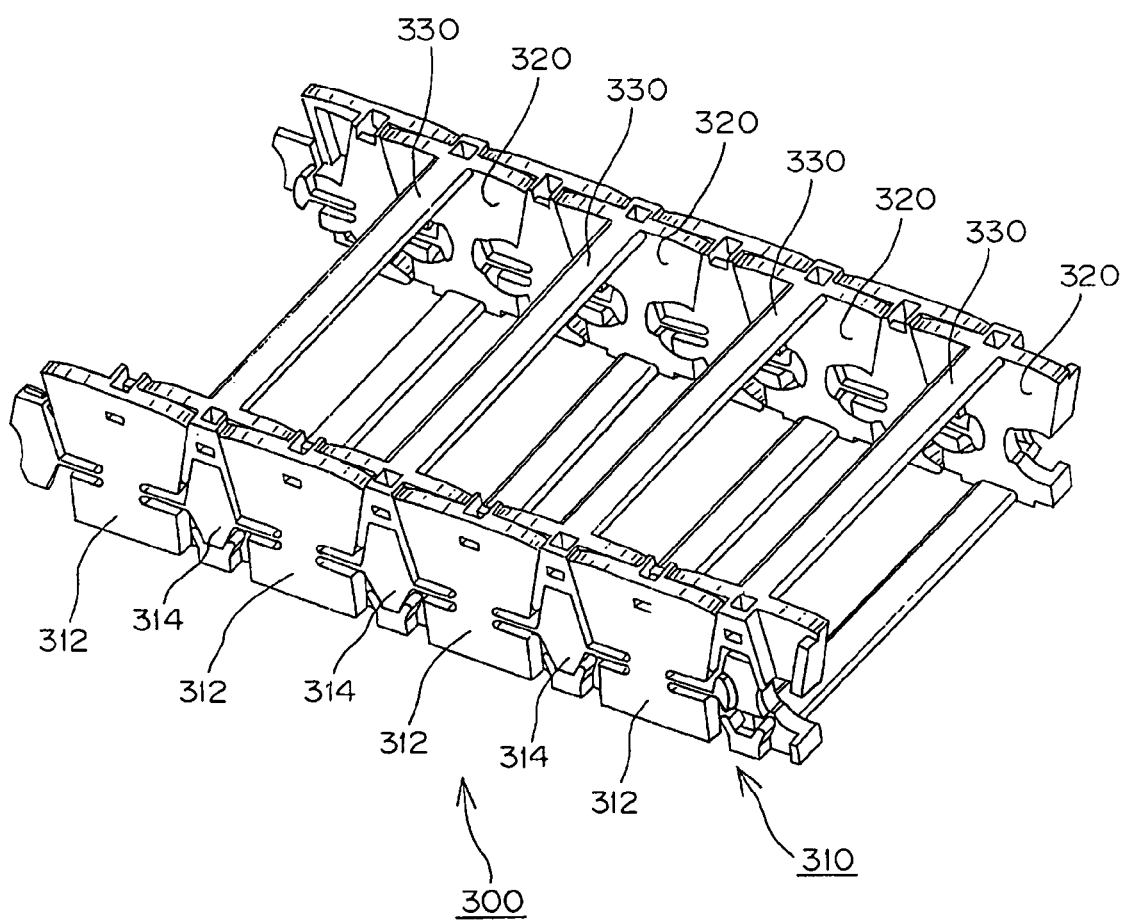
FIG. 9 is a perspective view showing a part of a cable protection and guide device 300, which is Example 3.

FIG. 9 is a perspective view showing a part of the cable protection and guide device 300, which is Example 3. FIG. 10 is an exploded view of the cable protection and guide device 300 shown in FIG. 9.

Figure 10:
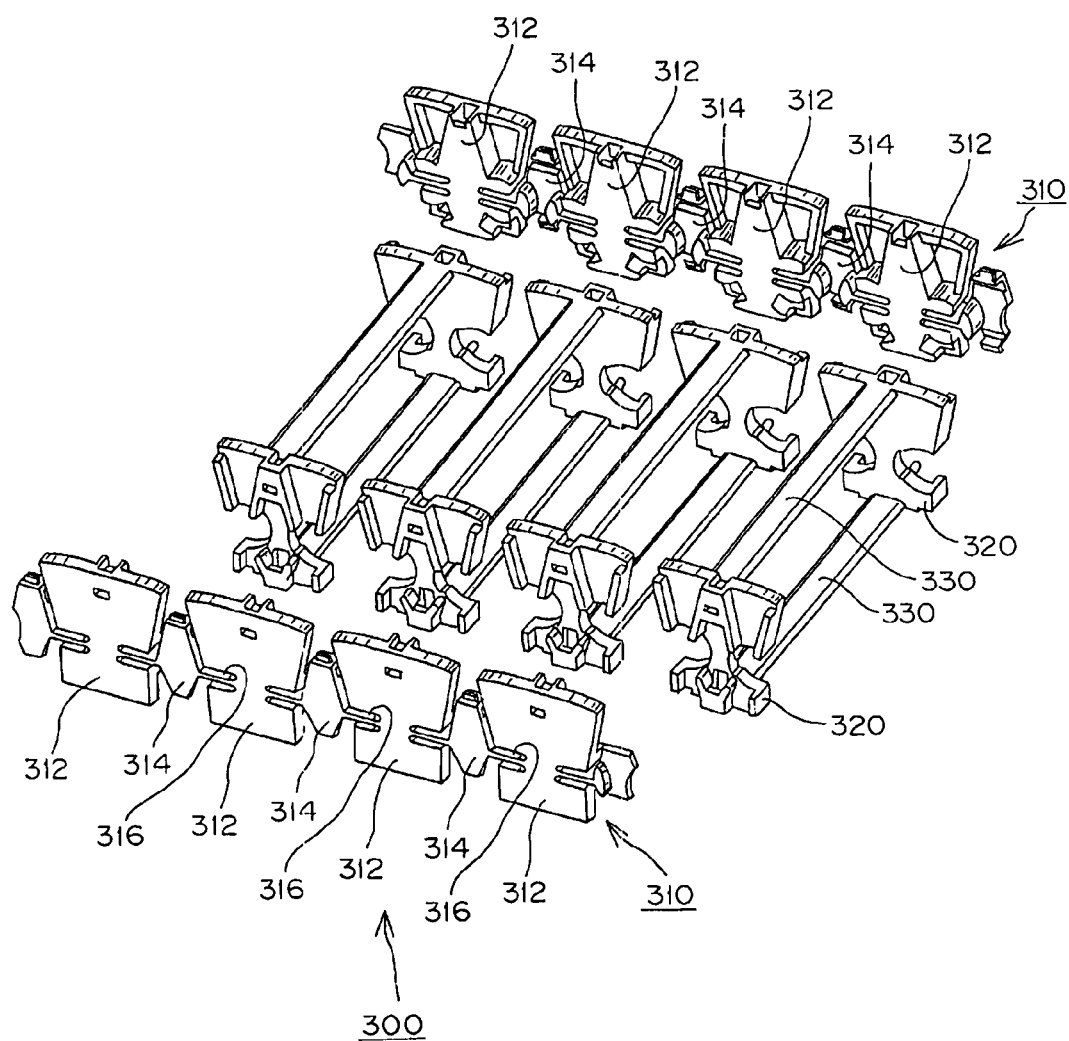
FIG. 10 is an exploded view of the cable protection and guide device 300 shown in FIG. 9.
Figure 11:
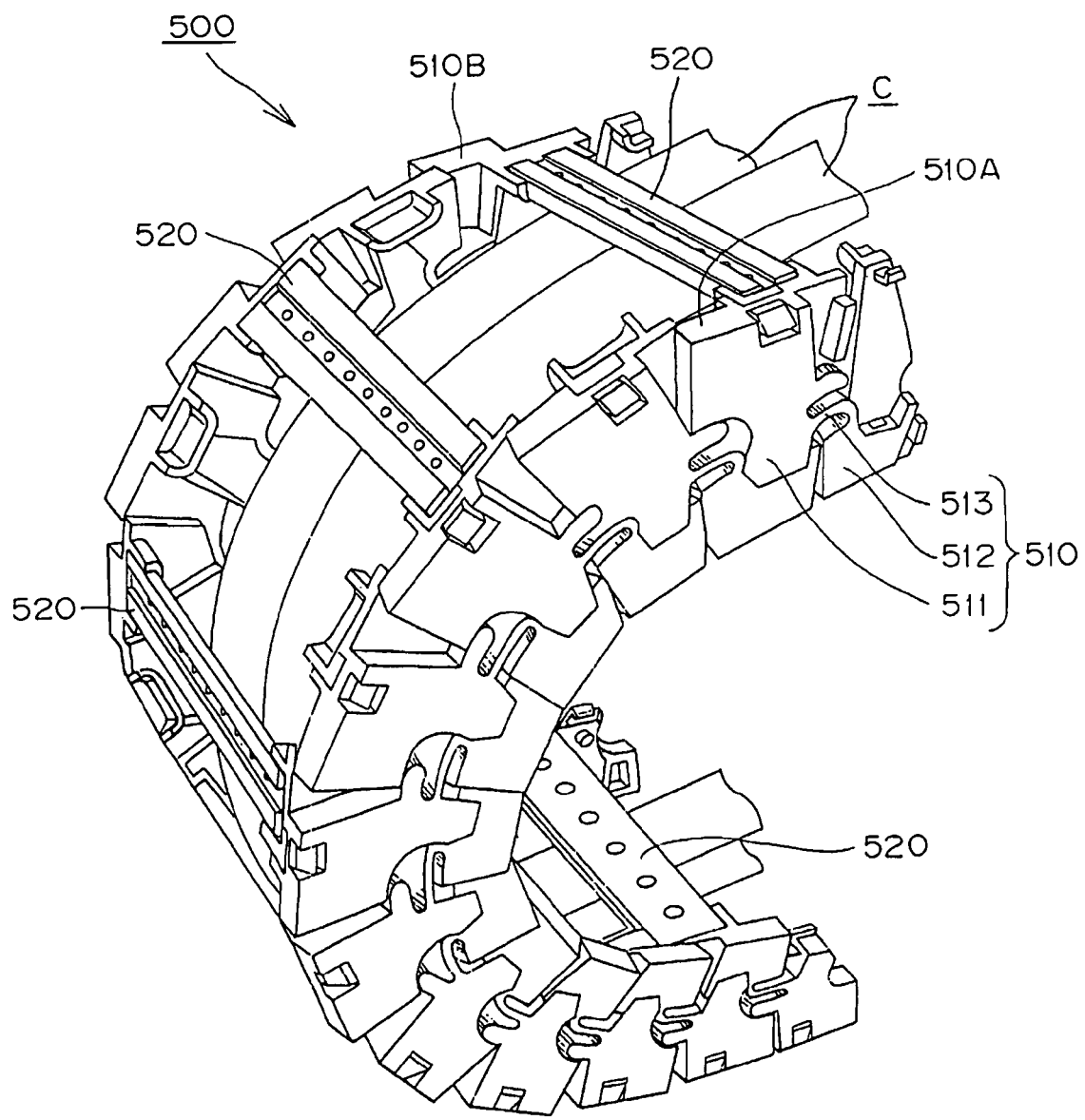
FIG. 11 is a perspective view showing a part of a conventional cable protection and guide device 500.

In the cable protection and guide device 300, which is Example 3, as shown in FIGS. 9 and 10, a plurality of side plate portions 312 and coupling portions 314 are integrally molded and form a connecting link module 310.

The plurality of side plate portions 312 form an elongated connecting link module 310. Horizontally elongated coupling arms 316 are connected to substantially diamond-shaped coupling portions 314 formed between adjacent side plate portions 312, 312 as shown in FIG. 10.

A polyacetal resin stopper link 320 is inter-fitted with a coupling portion 314 of the connecting link module 310 by a snap-fit mechanism from within the cable accommodating space side. The stopper link limits a bending inner circumferential side bending angle of the cable protection and guide device 300 as shown in FIG. 10.

Polyacetal resin upper and lower connecting arms 330 are integrally molded with the bending inner circumferential side and the bending outer circumferential side of a pair of right and left polyacetal resin stopper links 320 as shown in FIG. 10.

This configuration of the cable protection and guide device 300 further reduces the number of parts and further reduces assembly.

As described above, since the configurations and the functions of the individual members in Example 3 are the same as those of Example 1 except that the upper and lower connecting arms 330 are integrally molded with the bending inner circumferential side and the bending outer circumferential side of a pair of right and left stopper link 320 by use of a polyacetal resin, the overlapped (coextensive) explanations of Example 3 are omitted by changing reference numerals of 100s defined in Example 1 to reference numerals of 300s.

DESCRIPTION OF REFERENCE NUMERALS 100, 200, 300 . . . Cable protection and guide device
110, 210, 310 . . . Connecting link module
112, 212, 312 . . . Side plate portion
112a . . . Upper engagement region (of side plate portion)
112b . . . Lower engagement region (of side plate portion)
114, 214, 314 . . . Coupling portion
114a, 114b . . . Convex portion (snap-fit mechanism)
114c . . . Arc-shaped convex portion (of coupling portion)
116, 216, 316 . . . Coupling arm
117 . . . Connecting hook
117a, 117b . . . Convex portion (snap-fit mechanism)
117c . . . Arc-shaped cutout portion (of connecting hook)
117d . . . Arc-shaped convex portion (of connecting hook)
118 . . . Connecting plate
118c, 118d . . . Arc-shaped convex portion (of connecting plate)
118e . . . Arc-shaped cutout portion (of connecting plate)
120, 220, 320 . . . Stopper link
121, 122 . . . Concave portion (snap-fit mechanism)
123 . . . Coupling portion upper supporting portion
124 . . . Coupling portion lower supporting portion
125, 126 . . . Engagement concave portion
127 . . . Upper side convex portion (of stopper link)
128 . . . Lower side convex portion (of stopper link)
129 . . . Arc portion (of stopper link)
130, 230, 240, 330 . . . Connecting arm
132, 232 . . . Engagement hook The invention has been set forth by way of example only and those skilled in the art will readily recognize that changes may be made to the examples set forth herein without departing from the spirit and scope of the claims appended hereto.

The invention claimed is:

1. A cable protection and guide device, comprising:
coupling portions each having an interior portion and an exterior portion;
each of said coupling portions include a snap-fit mechanism in said interior portion thereof;
a plurality of polyacetal resin stopper links, each of said stopper links inter-fitted with a respective snap-fit mechanism in said interior portion of one of said coupling portions;
connecting link modules each of which includes a number of pairs of spaced right and left side plate portions articulately connected to each other by said coupling portions and said stopper links, said coupling portions reside between said side plate portions and are integrally molded with said side plate portions, said coupling portions and said side plate portions being made of a polyamide fatigue resistant resin;
said connecting link modules extend from a mounting fixed end to a mounting movable end enabling said connecting link modules formed by said side plates, said coupling portions and said stopper links to form a flexional circumferential bend having a flexional inner circumferential side and a flexional outer circumferential side;
each of said side plate portions, said coupling portions and said stopper links includes a flexional inner circumferential side residing during bending on said flexional inner circumferential side of said bend; each of said side plate portions, said coupling portions and said stopper links includes an outer circumferential side residing during bending on said outer flexional circumferential side of said bend;
first connecting arms are respectively bridged over said bending inner circumferential sides of said stopper links at predetermined intervals and second connecting arms are respectively bridged over bending outer circumferential sides of said stopper links at predetermined intervals;
a cable accommodated and guided in a cable accommodating space, said cable accommodating space being surrounded by said side plate portions, said coupling portions, said stopper links and said first and second connecting arms from said mounting fixed end toward said mounting movable end;

said cable protection and guide device assumes a linear position and a bending position;

and, said stopper links hold and limit said linear position and said bending position by engagement with said side plate portions of said connecting link modules.

2. A cable protection and guide device according to claim 1, wherein said polyamide fatigue resistant resin contains a rubber component.

3. A cable protection and guide device according to claim 2, wherein said connecting arms are formed of a polyacetal resin.

4. A cable protection and guide device according to claim 2, wherein said first connecting arms are molded integrally with said bending inner circumferential side of said stopper links and a wherein said second connecting arms are molded integrally with said bending outer circumferential side of said stopper links.

5. A cable protection and guide device according to claim 2, wherein said first connecting arms are molded integrally and flexibly with said bending inner circumferential side of one of said stopper links, said first connecting arms being movable between first open position and a second closed position.

6. A cable protection and guide device according to claim 1, wherein said first and second connecting arms are formed of a polyacetal resin.

7. A cable protection and guide device according to claim 6, wherein said first connecting arms are molded integrally with a said bending inner circumferential side of said stopper links and a wherein said second connecting arms are molded integrally with said bending outer circumferential side of said stopper links.

8. A cable protection and guide device according to claim 6, wherein said first connecting arms are molded integrally and flexibly with said bending inner circumferential side of one of said stopper links, said first connecting arms being movable between first open position and a second closed position.

9. A cable protection and guide device according to claim 1, wherein said first connecting arms are molded integrally with said bending inner circumferential side of said stopper links and wherein said second connecting arms are molded integrally with said bending outer circumferential side of said stopper links.

10. A cable protection and guide device according to claim 1, wherein said first connecting arms are molded integrally and flexibly with said bending inner circumferential side of one of said stopper links, said first connecting arms being movable between first open position and a second closed position.

* * * * *

UNITED STATES PATENT AND TRADEMARK OFFICE
CERTIFICATE OF CORRECTION

PATENT NO. : 7,637,092 B2
APPLICATION NO. : 12/359275
DATED : December 29, 2009
INVENTOR(S) : Akihiko Utaki and Masaaki Ikeda It is certified that error appears in the above-identified patent and that said Letters Patent is hereby corrected as shown below:

Col. 3, line 10, after "arms" delete "axe" and insert --are--;

Col. 12, line 7, after "and" delete "a".

Signed and Sealed this

Ninth Day of March, 2010

David J. Kappos
*Director of the United States Patent and Trademark Office*